(No Model.)

B. THORN & J. EVANS.
TOOTH FOR GRAIN DRILLS.

No. 247,967. Patented Oct. 4, 1881.

WITNESSES:
Thos. Houghton.
A. G. Lyne.

INVENTOR:
Barclay Thorn
James Evans
BY
ATTORNEYS.

UNITED STATES PATENT OFFICE.

BARCLAY THORN AND JAMES EVANS, OF JUNCTION CITY, MISSOURI.

TOOTH FOR GRAIN-DRILLS.

SPECIFICATION forming part of Letters Patent No. 247,967, dated October 4, 1881.

Application filed June 30, 1881. (No model.)

*To all whom it may concern:*

Be it known that we, BARCLAY THORN and JAMES EVANS, both of Junction City, in the county of Green and State of Missouri, have invented a new and useful Improvement in Teeth for Grain-Drills, of which the following is a full, clear, and exact description, reference being had to the drawings hereto annexed.

The object of our invention is to provide a combined tooth and colter, by means of which grain may be drilled in stubble land and sod without previous plowing.

Figure 1:
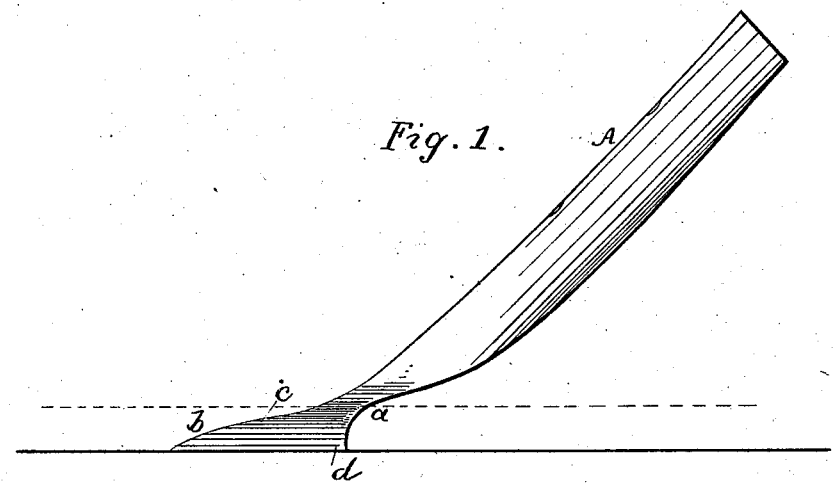
Figure 2:
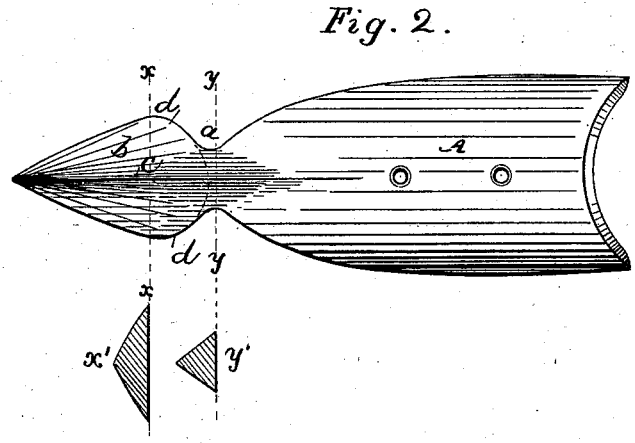

In the accompanying drawings, Figure 1 represents a side elevation of the improved tooth, and Fig. 2 a plan view, $x'$ and $y'$ being sections taken, respectively, on lines $x\,x$ and $y\,y$.

Our improved tooth for grain-drills is designed to be attached to any ordinary grain-drill when it is desired to put in a crop of wheat or other grain without the expense of first preparing the soil by plowing. This method of farming has been found by experience to possess many advantages, among which may be mentioned the following: By thus sowing a crop in stubble land the stubble will be left on the surface of the soil, to serve the double purpose of a top-dressing in winter and a mulch in summer, which is of the greatest advantage in the West, where the winters are rigorous and the summers often accompanied with drought.

Owing to the peculiar construction of this combined tooth and colter it is also adapted for drilling grain in timothy and clover lands when the latter have become partially barren, and in such manner as to preserve the sod of these lands and to loosen and cultivate the roots of the timothy and clover, so that after a crop of wheat, for instance, has been produced therein the lands will yield in the succeeding year an improved harvest of timothy and clover.

Having thus set forth the conditions which first suggested our invention, we will now proceed to a description of the latter.

In the drawings, A represents a tooth for a grain-drill, having its upper portion made concavo-convex, and provided with suitable means for being attached to a drill. Toward the lower end the edges of the tooth taper to a triangular neck, $a$, from which a colter, $b$, of peculiar shape, projects forward at an obtuse angle with the tooth proper. The under surface of the colter is plane and the upper surface slopes downward and backward from a central ridge, $c$, which extends from the point to the forward angle of the said neck. The colter is thus made comparatively thin, with the edges of its laterally-extending wings $d$ rounded at the rear and converging to a point in front.

When in use the tooth is designed to be so adjusted that the neck $a$ will cut the surface of the soil, thereby forming a narrow furrow for receiving the grain, which is dropped immediately behind it, while the wings $d$ will loosen the soil on both sides of the furrow and allow the same to be thrust along their rearward slopes and escape around the angles of the neck to cover the grain.

With this construction it will be seen that grain may be drilled without necessarily turning over the sod or materially interfering with the surface of the ground. In this manner the stubble, for the most part, will be left above soil, and where there is timothy or clover the roots of the same will be loosened, and thus cultivated, to the improvement of the succeeding harvest of said grasses.

We are aware that plow-shares and drills have been constructed with recesses cut in opposite sides, to allow the soil to pass behind for covering grain, and also that it is not broadly new to construct a colter with a plane under surface and downward-sloping sides, and we therefore do not broadly claim such a construction.

Having thus described our invention, what we claim as new, and desire to secure by Letters Patent, is—

In a grain-drill, a combined tooth and colter, consisting in the tapering tooth A, terminating in the triangular neck $a$ and the three-sided colter $b$, having its under surface plane and its upper surface sloping downward and backward from the central ridge, $c$, and its laterally-extending wings $d$ rounded at the rear and converging to a point in front, whereby the said neck alone will cut the surface of the soil, as specified.

BARCLAY THORN.
JAMES EVANS.

Witnesses:
A. M. TOWNSEND,
E. D. OTT.